Figure 1:
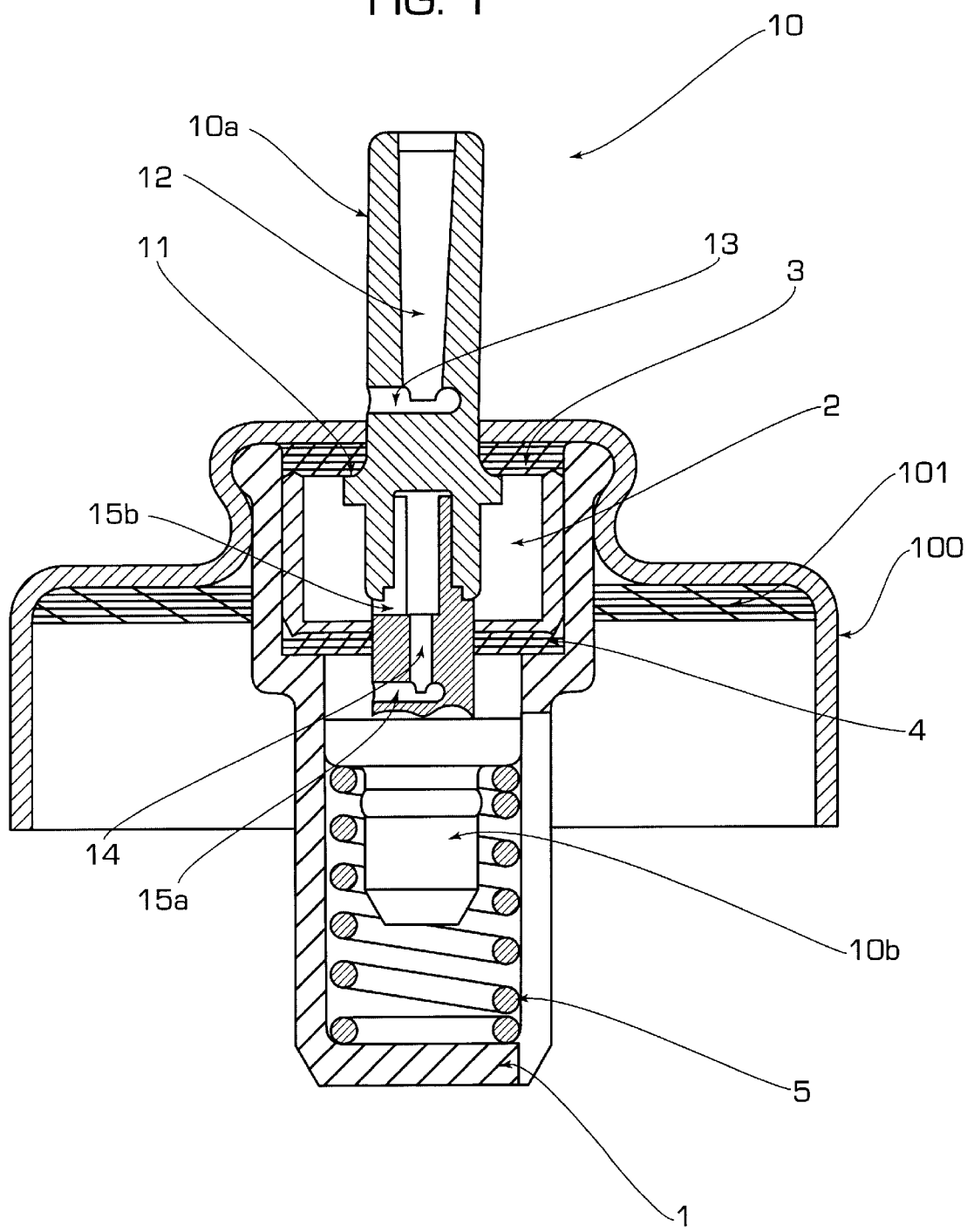

United States Patent
Di Giovanni et al.

[11] Patent Number: 6,112,950
[45] Date of Patent: Sep. 5, 2000

[54] LOW-FRICTION VALVE STEM

[75] Inventors: Patrick Di Giovanni, La Londe; Géralt Williams, Le Neubourg, both of France

[73] Assignee: Glaxo Group Limited, Greenford, United Kingdom

[21] Appl. No.: 09/051,967

[22] PCT Filed: Oct. 24, 1996

[86] PCT No.: PCT/FR96/01663

§ 371 Date: Feb. 22, 1999

§ 102(e) Date: Feb. 22, 1999

[87] PCT Pub. No.: WO97/16360

PCT Pub. Date: May 9, 1997

[30] Foreign Application Priority Data

Oct. 31, 1995 [FR] France .................................. 95 12840

[51] Int. Cl.[7] .................................................. B65D 83/00
[52] U.S. Cl. ............................................................ 222/402.1
[58] Field of Search ........................... 222/402.1, 402.17, 222/402.24, 514, 402.12, 402.13, 519, 520, 542

[56] References Cited

U.S. PATENT DOCUMENTS

| | | | |
|---|---|---|---|
| 3,586,216 | 6/1971 | Jordan et al. | 222/402.24 |
| 3,680,790 | 8/1972 | Boris | 222/402.1 |
| 3,796,352 | 3/1974 | Morane | 222/402.24 |
| 3,808,954 | 5/1974 | Persson et al. | 92/65 |
| 5,027,986 | 7/1991 | Heinzel et al. | 222/402.24 |
| 5,037,013 | 8/1991 | Howlett | 222/402.24 |
| 5,078,987 | 1/1992 | Nakamura et al. | 222/402.1 |
| 5,083,684 | 1/1992 | Ebina et al. | 222/402.1 |
| 5,427,282 | 6/1995 | Greenleaf et al. | 222/402.1 |
| 5,560,544 | 10/1996 | Merritt et al. | 239/104 |

FOREIGN PATENT DOCUMENTS

| | | |
|---|---|---|
| 642 992 | 3/1995 | European Pat. Off. . |
| 2 713 299 | 6/1995 | France . |
| 26 46 149 | 4/1978 | Germany . |

*Primary Examiner*—Philippe Derakshani
*Attorney, Agent, or Firm*—Sughrue, Mion, Zinn, Macpeak & Seas, PLLC

[57] ABSTRACT

A valve device is provided for being mounted in the neck opening of a receptacle containing a substance to be dispensed. The device includes a valve body (1) having therein a chamber (2) defined axially at one end by an annular valve gasket (3) including a central opening, and a valve plunger (10) passing through the gasket (3) and including a dispensing channel (12) opening out in its outside surface via a radial hole (13). The valve plunger (10) is molded out of a material which includes a mixture of acetal resin, polytetrafluoroethylene (PTFE), and silicone, so that the valve plunger (10) slides with low friction over the valve gasket (3).

5 Claims, 2 Drawing Sheets

LOW-FRICTION VALVE STEM

The present invention relates to an improved dispenser valve, and more particularly to a plunger of a metering valve.

Dispenser valves are well known in the state of the art. Their main application lies with aerosol receptacles for dispensing liquid substances that are charged with a propellant (gas dissolved under pressure). For a metering valve, the valve generally comprises a valve body containing a metering chamber defined axially by two annular gaskets, a valve gasket and a chamber gasket, and a valve plunger that is movable between a rest position and an actuation position. The valve plunger is urged by a spring towards its rest position, in which a shoulder on said plunger bears against the bottom surface of said valve gasket. To actuate a metering valve, the valve plunger is pressed so that it slides inside the valve body through annular gaskets to its actuation position, in which a measured quantity of the substance is expelled. The spring then returns the valve plunger to its rest position.

A problem that arises with the plungers of valves, in particular of metering valves, specifically concerns sealing at the valve gasket. Firstly it is necessary for the valve plunger to be able to slide between its actuation position and its rest position under drive from the spring, while preventing any leaks from taking place. Secondly, when the valve plunger is in its rest position, sealing must be complete in spite of the pressure that obtains inside the metering chamber and the receptacle.

To solve those problems, known valves include a cylindrical plunger having as an extension from said shoulder at least on that portion of the valve plunger which slides through the valve gasket, a constant outside diameter approximately equal to (and generally very slightly greater than) the diameter of the central opening in the valve gasket. To guarantee sealing in the rest position, a frustoconical portion is generally provided adjacent to said shoulder extending axially over a portion of the thickness of said valve gasket. In this way, the valve plunger slides with friction through the valve gasket, the force exerted by the spring being greater than said friction, and in its rest position, the frustoconical portion adjacent to said shoulder contributes to providing sealing at the valve gasket.

A drawback of that implementation lies in the fact that the friction which appears during sliding of the valve plunger can be relatively large, which can cause said valve plunger to become jammed.

That phenomenon is further amplified when, particularly for ecological reasons, it is desired to replace propellant gases that are harmful for the environment, such as CFCs, with propellant gases that are not harmful or that are less harmful for the environment, for example HFA gases. Unfortunately, the use of such gases presenting little or no threat to the environment requires the pressure inside the body of the valve to increased considerably, and this increase may be as much as 50%. It is therefore necessary to achieve even greater sealing at the valve gasket, which means a large amount of friction between the plunger and said gasket.

One possible solution for overcoming that drawback is to provide a spring of stiffness that is sufficiently great. However, that requires a large force to actuate the metering valve, which is undesirable.

Another solution consists in coating valve plungers in a layer of silicone in order to improve their friction qualities. That solution is fairly satisfactory with propellant gases such as CFCs, however it is insufficient when HFA gases are used. Such HFA gases remove the silicone progressively, such that after some number of uses, the problem of the valve plunger jamming reappears.

An object of the invention is to provide a valve, in particular a metering valve, having a valve plunger made in such a manner as to avoid untimely jamming thereof by friction against the valve gasket when said valve plunger moves from its actuation position towards its rest position under drive from the spring, while nevertheless ensuring sealing at said valve gasket during the movement.

Another object of the invention is to provide a valve, in particular a metering valve, including a plunger that is made in such a manner as to be capable of operating in reliable and safe manner with a spring of small stiffness, thereby making the valve easier to actuate.

Yet another object of the invention is thus to provide a valve, in particular a metering valve operating with a propellant gas that is not harmful for the environment, said valve including a plunger capable of sliding without leakage and without risk of jamming between its actuation position and its rest position under drive from the spring.

The invention thus provides a valve device designed to be mounted in the neck opening of a receptacle containing a substance to be dispensed, the device comprising both a valve body having therein a chamber defined axially at one end by an annular valve gasket including a central opening, and a valve plunger passing through the gasket and including a dispensing channel opening out in its outside surface via a radial hole, said valve plunger being movable inside the valve body between a rest position in which the radial hole opens outside the chamber and an actuation position in which the radial hole opens inside the chamber, the valve plunger being urged by a resilient member towards its rest position, the device being characterized in that said valve plunger is molded out of a material comprising a mixture of acetal resin, polytetrafluoroethylene (PTFE), and silicone, such that said valve plunger slides with low friction over said valve gasket.

The use of such a material for making the valve plunger thus makes it possible to improve sliding of said plunger, in particular through the valve gasket. For a valve plunger and a valve gasket of given dimensions, and thus of equal sealing ability, the valve plunger of the invention thus slides with less friction, thereby ensuring that the valve plunger does not begin to jam.

Preferably, said material of the valve plunger is constituted by acetal resin, PTFE, and silicone.

Advantageously, said acetal resin is polyoxymethylene.

In particular, the material of the valve plunger includes up to about 25% PTFE and up to about 10% silicone.

Advantageously, the silicone is incorporated in the material of the valve plunger in the form of silicone oil. Optionally, the valve plunger may also be coated in an outer layer of silicone.

According to a particular aspect of the invention, the valve is a metering valve and the chamber is a metering chamber defined axially at its end remote from the valve gasket by an annular chamber gasket including a central opening through which the valve plunger passes. In this case, the valve plunger of the invention also serves to limit friction at the chamber gasket.

Figure 2:
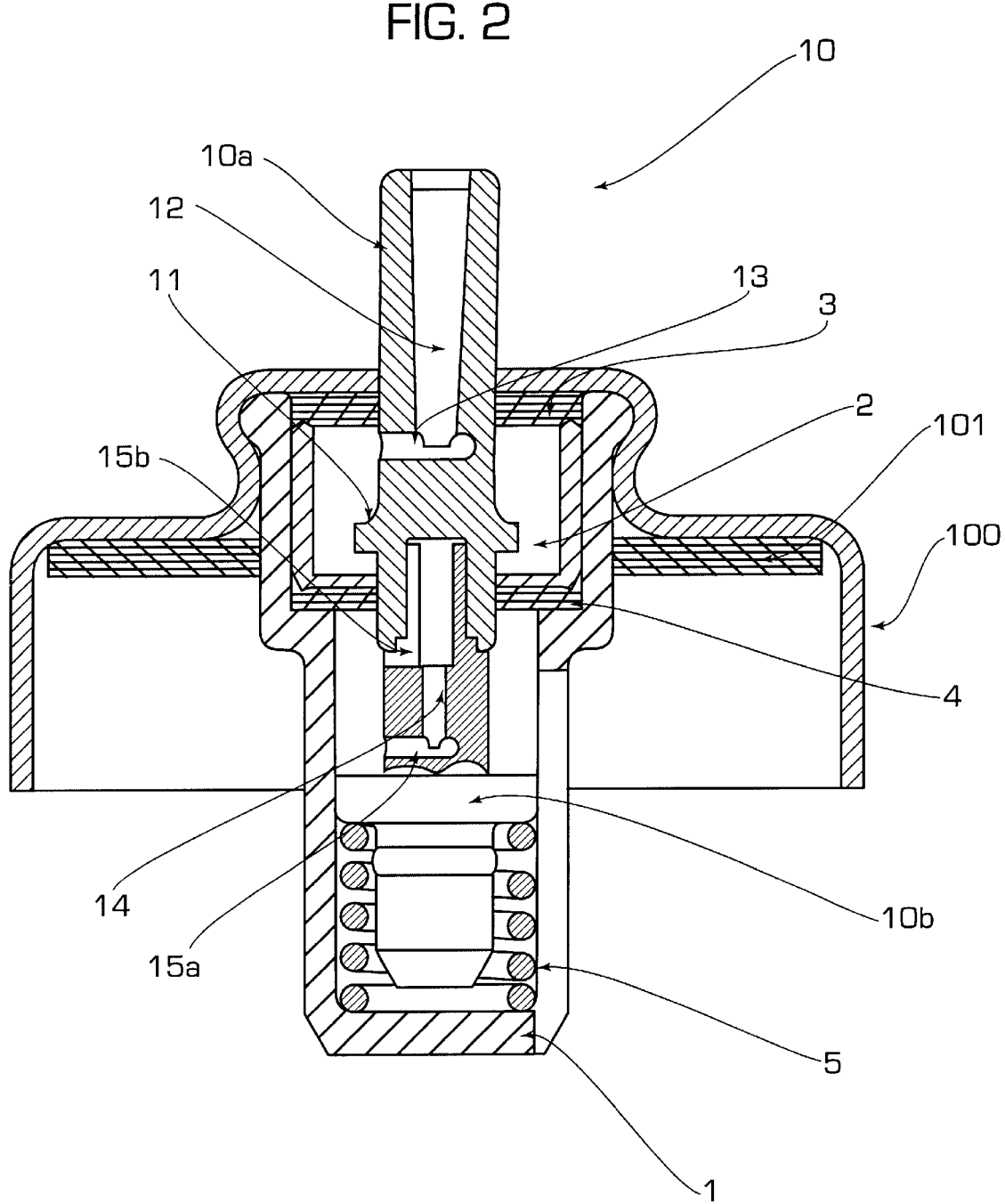

Other characteristics and advantages appear on reading the following detailed description of the invention given by way of non-limiting example, and with reference to the accompanying drawings, in which:

FIG. 1 is a diagrammatic section through a metering valve constituting an embodiment of the present invention, the valve plunger being in its rest position; and FIG. 2 is a view similar to FIG. 1, with the valve plunger being shown in its actuation position.

With reference to FIGS. 1 and 2, a metering valve of the invention comprises a valve body 1 containing a metering chamber 2. The metering chamber 2 is axially defined by two annular gaskets: a valve gasket 3, and a chamber gasket 4. Each of these two gaskets has a central opening through which a valve plunger 10 passes, which plunger is movable inside the valve body 1 between a rest position shown in FIG. 1 and an actuation position shown in FIG. 2. The valve plunger 10 is urged towards its rest position by a resilient member such as a spring 5 bearing both against the end of the valve body 1 and against the bottom end of the valve plunger.

The valve body 1 is crimped in a capsule 100 which subsequently serves for fixing to the neck of a receptacle or flask of any kind (not shown), e.g. by crimping. Advantageously, a neck gasket 101 is provided between said capsule 100 and said receptacle neck.

The valve plunger 10 has a top element 10a extending outside the valve body 1, and a bottom element 10b on which said spring 5 acts.

The top element 10a of the valve plunger has an axial channel 12 opening out via a radial hole 13 to the outside surface thereof. In the rest position of the valve plunger, said radial hole 13 opens out on the outside of the valve gasket 3, whereas in said actuation position, it opens out inside the metering chamber 2.

The top element 10a of the valve plunger also includes a radial shoulder 11 which bears against the bottom surface of the valve gasket 3 when the valve plunger 10 is in its rest position, and which thus defines said rest position by acting as an abutment member against the thrust from the spring 5.

The bottom element 10b of the valve plunger also includes an axial duct 14, a bottom radial duct 15a, and a top radial duct 15b. In the rest position of the valve plunger, these ducts 14, 15a, and 15b connect a tank of substance to the metering chamber 2, enabling said chamber to be filled, while in the actuation position of the valve plunger, neither of the two radial ducts 15a and 15b opens out into the metering chamber 2.

The operation of this metering valve is conventional. The user exerts pressure on the top element 10a of the valve plunger 10, having the effect of moving it away from its rest position, against the force of the spring 5. As soon as this movement starts, the top radial duct 15b no longer opens out into the metering chamber 2 so the chamber becomes hermetically closed by said top element 10a of the valve plunger engaging the chamber gasket 4 and the valve gasket 3. When the valve plunger 10 reaches its actuation position, the radial hole 13 of the top element 10a of the valve plunger opens out into the metering chamber 2, thereby enabling the quantity of substance contained in said metering chamber to be dispensed via the axial channel 12. The user then releases pressure on the valve plunger 10 which is returned by the spring 5 to its rest position where the top radial duct 15b opens out into the metering chamber 5, to enable it to be filled with another measured quantity of substance.

To ensure that the metering valve operates, and in particular that the valve plunger returns from its actuation position to its rest position under drive from the spring 5, thereby avoiding "sticking" problems, i.e. problems associated with said valve plunger jamming because of friction exerted by the valve gasket 3, the invention provides for the valve plunger 10 to be made of a material having improved friction qualities, i.e. that slides better over the sealing gaskets. For this purpose, the invention provides for the valve plunger 10 to be made of a material comprising an acetal resin, polytetrafluoroethylene (PTFE), and silicone. More specifically, the acetal resin may be polyoxymethylene and the silicone may be present in the mixture in the form of silicone oil. Typically, a material made of polyoxymethylene constituting about 80% by weight, of PTFE constituting about 15% by weight, and of silicone oil constituting about 5% by weight is suitable for making the valve plunger of the invention. Such a material is commercially available (material KL-4540-LE from Engineering Plastics).

Since the valve plunger 10 slides better over the sealing gaskets, its outside dimensions can be designed in such a manner as to enable it to co-operate with the gasket so as to achieve perfect sealing, even when using a non-harmful gas such as an HFA, while nevertheless ensuring good sliding through the central openings of said gaskets, and thus avoiding any problems of the plunger jamming.

Since the stiffness of the spring 5 should be directly proportional to the friction forces exerted by the valve gasket 3, the invention thus makes it possible to use a spring of smaller stiffness. This makes it easier to actuate the metering valve of the invention in that the force required for actuation purposes is reduced.

Another advantage of the valve plunger of the invention is that because the friction forces exerted by the valve gasket 3 on the valve plunger 10 as it returns to its rest position are reduced, said valve plunger moves faster, thereby increasing the reliability of the valve.

The invention thus guarantees that the metering valve operates reliably and it also guarantees complete sealing at the valve gasket, thereby making it possible, in particular, to use propellant gases that are not harmful for the environment, such as HFA gases, in spite of the considerable increase of pressure inside the metering chamber. In addition, it becomes possible to use a spring of lower stiffness, thereby making the metering valve easier to actuate.

The invention is described above with reference to the figures which show a metering valve operating in the upright position, however the invention naturally also applies to metering valves operating in the upside-down position.

What is claimed is:

1. A valve device to be mounted in the neck opening of a receptacle containing a substance to be dispensed, the device comprising both a valve body (1) having therein a chamber (2) defined axially at one end by an annular valve gasket (3) including a central opening, and a valve plunger (10) passing through the gasket (3) and including a dispensing channel (12) opening out in its outside surface via a radial hole (13), said valve plunger (10) being movable inside the valve body (1) between a rest position in which the radial hole (13) opens outside the chamber (2) and an actuation position in which the radial hole (13) opens inside the chamber (2), the valve plunger (10) being urged by a resilient member (5) towards its rest position, the device being characterized in that said valve plunger (10) is molded out of a material comprising a mixture of acetal resin, polytetrafluoroethylene (PTFE), and silicone, such that said valve plunger (10) slides with low friction over said valve gasket (3), wherein said material of the valve plunger (10) consists essentially of acetal resin, PTFE, and silicone.

2. A device according to claim 1, in which said acetal resin is polyoxymethylene.

3. A device according to claim 1, in which the material of the valve plunger (10) includes up to about 25% PTFE and up to about 10% silicone.

4. A device according to claim 1, in which the silicone is incorporated in the material of the valve plunger (10) in the form of silicone oil.

5. A device according to claim 1, in which the valve is a metering valve and the chamber (2) is a metering chamber that is axially defined at its end remote from the valve gasket (3) by an annular chamber gasket (4) having a central opening through which the valve plunger (10) passes, said valve plunger (10) sliding with low friction over said chamber gasket (4).

* * * * *